(12) United States Patent
Mizutani et al.

(10) Patent No.: US 7,460,692 B2
(45) Date of Patent: Dec. 2, 2008

(54) IMAGE FORMING APPARATUS

(75) Inventors: Akihiro Mizutani, Tokyo (JP);
Kazuhiro Ogura, Yokohama (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 818 days.

(21) Appl. No.: 10/937,413

(22) Filed: Sep. 10, 2004

(65) Prior Publication Data

US 2006/0056666 A1 Mar. 16, 2006

(51) Int. Cl.
*G06K 9/00* (2006.01)

(52) U.S. Cl. .................. 382/118; 358/1.14; 358/1.15

(58) Field of Classification Search .............. 382/118; 455/463, 426.1, 555; 345/169, 672; 235/375, 235/454; 340/7.6; 84/DIG. 12; 700/83; 707/E17.022, E17.026; 726/5, 19, 22; 709/229, 709/225; 358/1.13, 1.14, 1.15, 402; 399/81; 701/20; 718/100
See application file for complete search history.

(56) References Cited

U.S. PATENT DOCUMENTS

| | | | | |
|---|---|---|---|---|
| 6,108,790 A * | 8/2000 | Moriya et al. | ................... | 726/5 |
| 6,141,438 A * | 10/2000 | Blanchester | ................ | 382/140 |
| 6,549,913 B1 * | 4/2003 | Murakawa | ............... | 707/104.1 |
| 6,711,687 B1 * | 3/2004 | Sekiguchi | ..................... | 726/23 |
| 6,711,688 B1 * | 3/2004 | Hubacher et al. | .............. | 726/7 |
| 6,836,843 B2 * | 12/2004 | Seroussi et al. | ............. | 713/173 |
| 6,922,488 B2 * | 7/2005 | Mastrianni et al. | .......... | 382/199 |
| 7,111,322 B2 * | 9/2006 | Slick et al. | ..................... | 726/5 |
| 7,154,617 B2 * | 12/2006 | Ikeno | ........................ | 358/1.13 |
| 7,239,409 B2 * | 7/2007 | Parry | ........................ | 358/1.15 |
| 2004/0136574 A1 * | 7/2004 | Kozakaya et al. | ........... | 382/118 |

FOREIGN PATENT DOCUMENTS

| | | |
|---|---|---|
| JP | 11-144060 A | 5/1999 |
| JP | 2002-506265 A | 2/2002 |
| WO | WO 99/45710 A1 | 9/1999 |

OTHER PUBLICATIONS

U.S. Appl. No. 10/796,132, filed Mar. 10, 2004, Mizutani.
U.S. Appl. No. 10/945,445, filed Sep. 21, 2004, Ogura.

* cited by examiner

*Primary Examiner*—Sheela C Chawan
(74) *Attorney, Agent, or Firm*—Foley & Lardner LLP

(57) ABSTRACT

An image forming apparatus includes a camera which photographs an operator, an authentication unit to authenticate whether or not facial data indicating an operator's face photographed by the camera indicates a registered person based on a result of searching for the facial data registered in a facial data storage unit in which the facial data indicating the operator's face is registered beforehand, and a control unit to control an only predetermined function executable by a person other than the registered person in a case where that it is judged that the operator is not the registered person by an authentication result of the authentication unit.

14 Claims, 10 Drawing Sheets

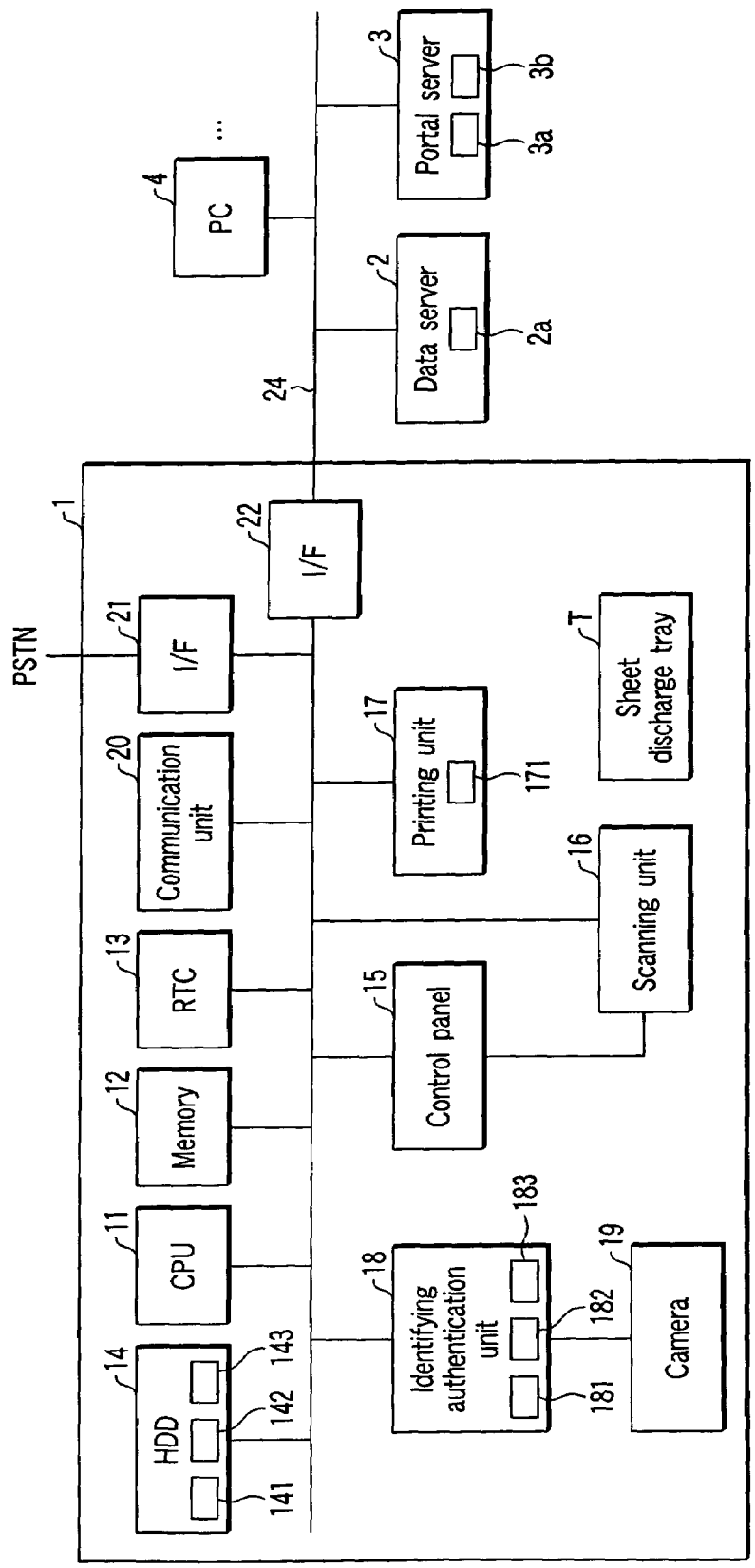
F I G. 1

IMAGE FORMING APPARATUS

BACKGROUND OF THE INVENTION

1. Field of the Invention

The present invention relates to an image forming apparatus having an authentication unit which authenticates an operator.

2. Description of the Related Art

In Jpn. Pat. Appln. KOKAI Publication No. 11-144060, a method is described in which identification is performed without requiring carrying of cash, seal, card, insurance certificate, commuter pass or the like and which is not known by others and in which there is no possibility that illegal utilization is performed by others. Concretely, a registered person's face (or hand or face is satisfactory) is photographed beforehand. In confirmation places such as purchasing places of various types of goods, windows of utilization facilities, and entrances of residences or confidential facilities, the face of a person to be confirmed is photographed, and compared with the registered person's face for judgment. Only in the case of identification match is it possible to draw or deposit money or to purchase the goods, or an entrance certificate or the like is issued to permit entrance to the residence or the utilization facility. Moreover, when the person cannot be identified as a result of the comparison/judgment, no operation can be performed, money cannot be drawn, or an entrance certificate is not issued to thereby inhibit the entrance to the facilities.

Moreover, it has been known that an image forming apparatus having a copying function or the like comprises an authentication unit as described above. Also in this image forming apparatus, the authentication unit is used in permitting/not-permitting use in the same manner as in the above-described publication. Therefore, those who cannot be authenticated are inhibited from using anything.

Therefore, there has been a need for an image forming apparatus capable of effectively utilizing an authentication result by the authentication unit instead of setting the permission/non-permission of the use based on the authentication result by the authentication unit.

BRIEF SUMMARY OF THE INVENTION

According to an aspect of the present invention, there is provided an image forming apparatus comprising: a camera which photographs an operator; an authentication unit to authenticate whether or not facial data indicating an operator's face photographed by the camera indicates a registered person based on a result of searching for the facial data registered in a facial data storage unit in which the facial data indicating the operator is registered beforehand; and a control unit to control an only predetermined function which can be executed by a person other than the registered person in a case where that the operator is not the registered person by an authentication result of the authentication unit.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 1 is a diagram schematically showing a structure of MFP in a first embodiment of the present invention;

DETAILED DESCRIPTION OF THE INVENTION

Figure 2:
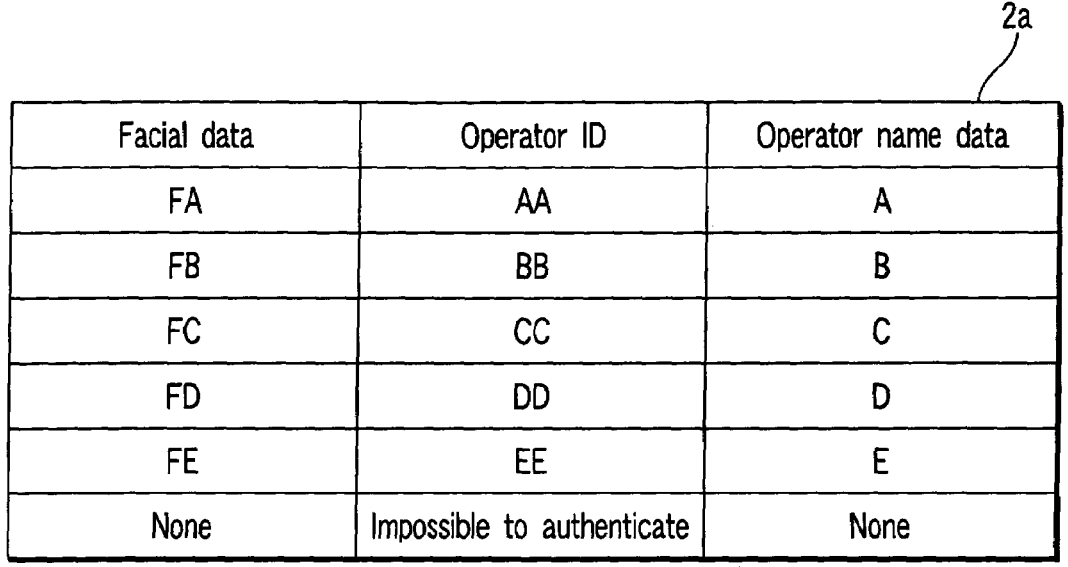
FIG. 2 is a table showing contents stored in a data server.

The present invention will be described hereinafter in accordance with embodiments in a case where the present invention is applied to multi function peripherals (MFPs) having various functions such as a copying function, a printer function, a network scanner function, and a facsimile function with reference to the drawings.

First Embodiment

FIG. 1 is a diagram schematically showing a constitution of an MFP 1. The MFP 1 has: a CPU 11 which is a control unit; a memory 12; a real time clock (RTC) 13; a hard disk drive (HDD) 14; a control panel 15; a scanning unit 16; a printing unit 17; an identifying authentication unit 18; a camera 19; a communication unit 20; an interface (I/F) 21; an interface (I/F) 22; a sheet discharge tray T and the like. It is to be noted that the CPU 11, memory 12, real time clock (RTC) 13, HDD 14, control panel 15, scanning unit 16, printing unit 17, identifying authentication unit 18, communication unit 20, I/F 21, and I/F 22 are connected to one another via a bus line 23. The I/F 22 is connected to a data server 2, a portal server 3, and a personal computer (PC) 4 via a local area network (LAN) 24.

The CPU 11 executes a control program stored in the memory 12 to thereby generally control the MFP 1. A predetermined area of the memory 12 is a work area at a time when the CPU 11 executes the control program. The RTC 13 produces present time information.

Figure 4:
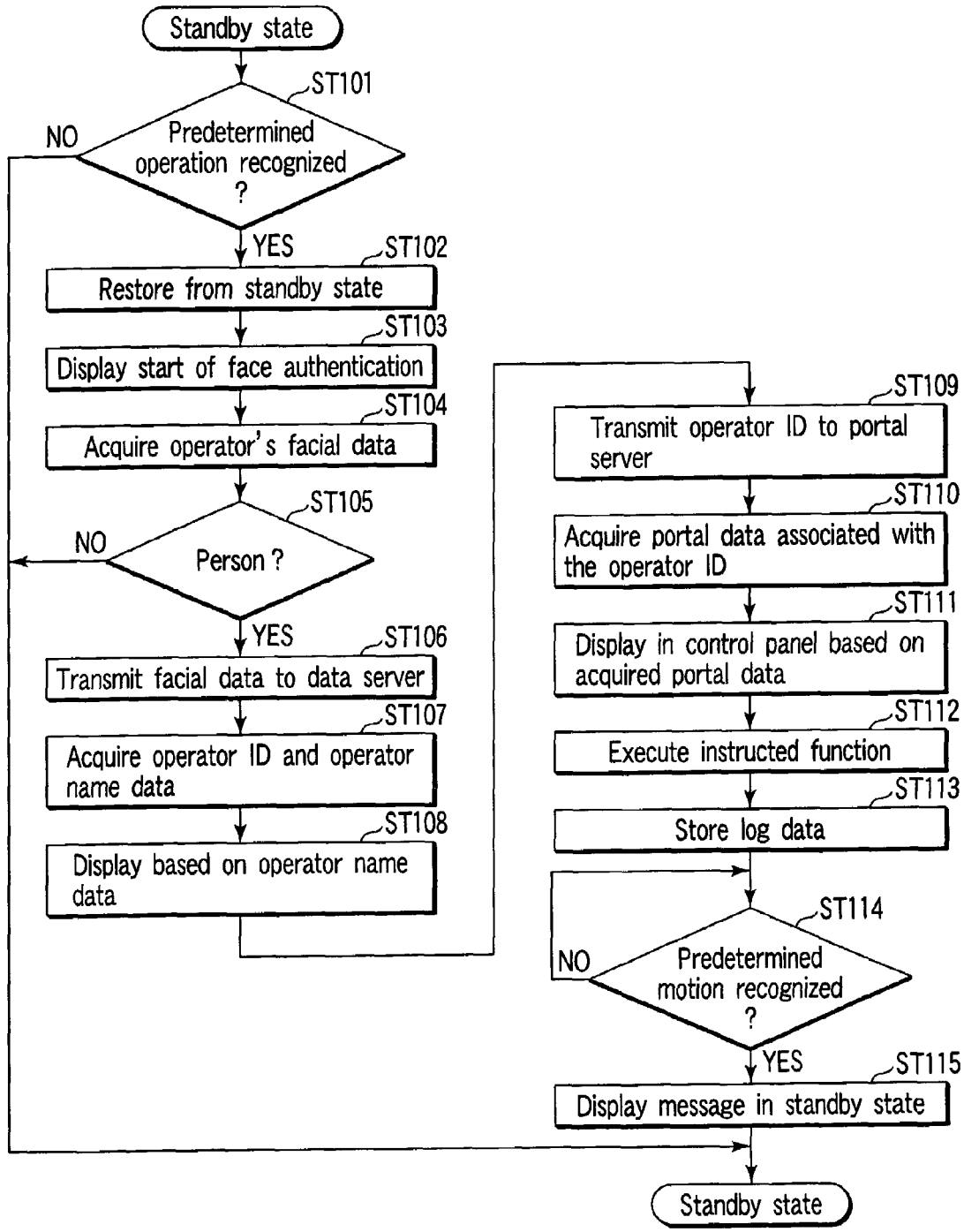
FIG. 4 is a flowchart showing a flow of a process executed by CPU.
Figure 22:
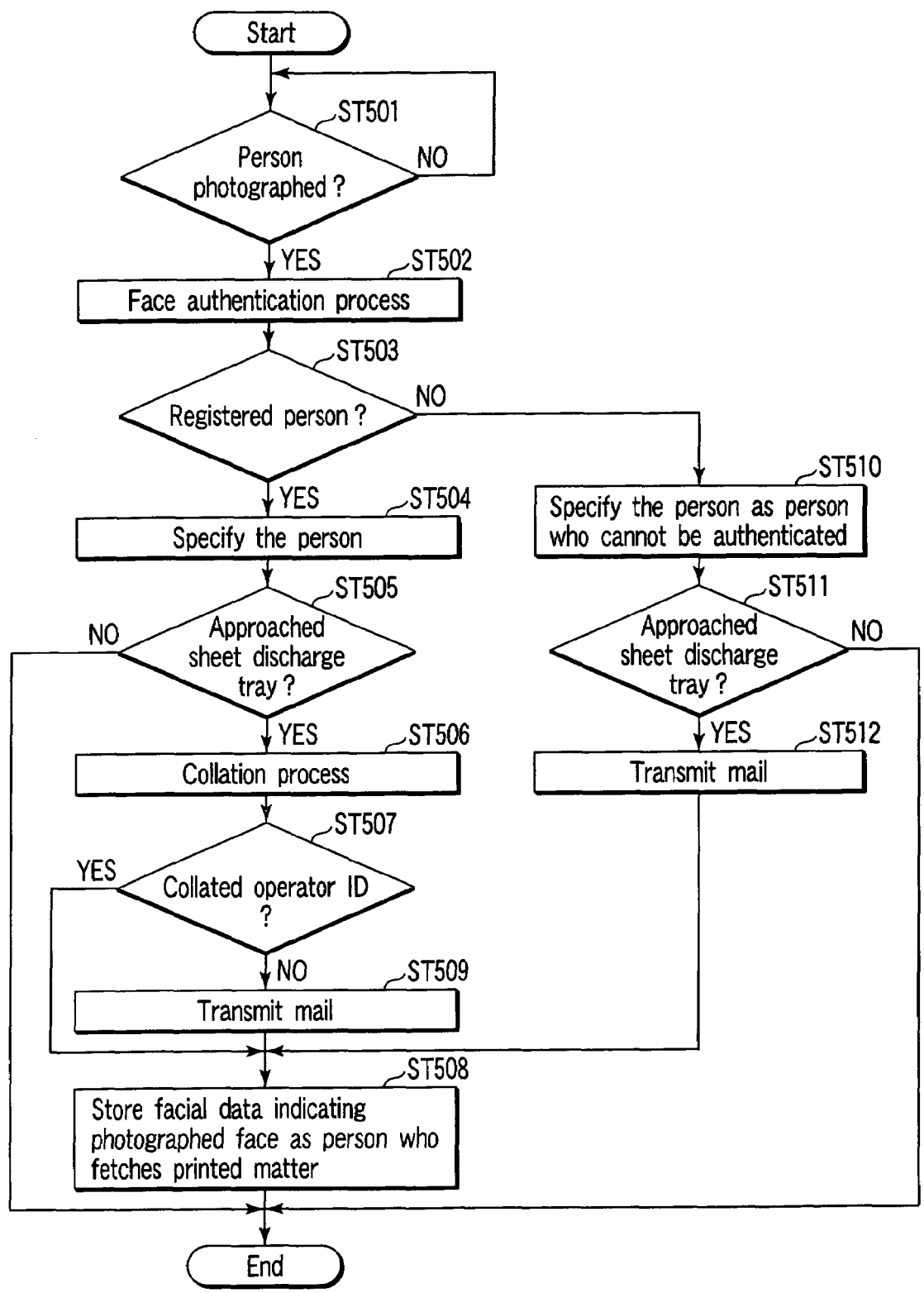
FIG. 22 is a flowchart showing a process executed by the CPU at a time when history data is stored and a mail is transmitted.

The HDD 14 has a log data storage unit 141 which stores log data, an authentication result data storage unit 142 which stores authentication result data, a job storage unit 143 which stores a printing job received from the outside via the communication unit 20, and stores various data in addition to these data. The log data records contents at a time when an operator performs various operations. The log data concretely includes an operator ID, operation data indicating process contents such as copying and scanning, date/time data and the like. In the log data, facial data acquired from data photographed by the camera 19 is also associated and stored, when a face authentication process described later with reference to FIG. 4 is performed. The authentication result data storage unit 142 stores authentication result data indicating authentication results at a time when the face authentication process described later with reference to FIG. 22 is performed. The authentication result data concretely includes an operator ID, facial data of a person who has come to take a printed matter in the sheet discharge tray, and date/time data. The authentication result data is associated and stored with the log data, when stored in the authentication result data storage unit. It is to be noted that the log data storage unit 141 and the authentication result data storage unit 142 do not have to be disposed in the MFP 1, and may be disposed in an external device connected to the LAN 24, for example, the data server 2.

The control panel 15 is a touch panel of a large-sized display type. Information required for the operator is displayed, and an instruction from the operator is accepted.

The scanning unit 16 reads an image from a draft laid on a draft base (not shown) or a plurality of drafts continuously fed from an auto document feeder (ADF) to produce image data. Since a structure and operation for reading the image data of a scanner are similar to conventional structure and operation, description is omitted.

When printing data such as a printing job stored in the job storage unit 143 of the HDD 14 is transferred to a buffer 171, the printing is performed with respect to each page based on the printing data. The printing unit 17 is composed, for example, by an ink jet system or an electronic photography system. A printed matter printed in this manner is discharged onto the sheet discharge tray T. Since a structure and operation of the printing unit 17 for forming an image based on the printing data are similar to conventional structure and operation, description is omitted.

The identifying authentication unit 18 has an authentication unit 181, a motion capture unit 182, and a motion data storage unit 183. In the authentication unit 181, a control program is stored to realize a face authentication function of receiving an image ID based on facial data indicating the face, transmitted to the data server 2 from data photographed by the camera 19, to authenticate whether or not the operator is a person registered as the operator. In the motion capture unit 182, a control program is stored to realize a motion capture function of capturing a motion with respect to data indicated by the image photographed by the camera 19. The motion data storage unit 183 stores motion data indicating a preset motion. This predetermined motion is, for example, a human gesture of waving hands. However, the motion is not limited to this gesture, and may be a human motion of approaching toward the camera 19, or a specific motion using a sign language. It is to be noted that the motion of the person approaching the MFP 1 indicates that the person looks at a direction of the camera 19. The motion data stored in the motion data storage unit 183 is not limited to one type, and a plurality of types of motion data may be stored.

The camera 19 is, for example, a video camera, and constantly photographs the periphery of the MFP 1 including the vicinity of the sheet discharge tray onto which the printed matter is discharged.

The communication unit 20 controls communication with external devices connected to the I/F 21 and I/F 22. The I/F 21 is an interface for connection to a public switched telephone network (PSTN), and is used in performing facsimile communication. The I/F 22 is used in performing communication with the data server 2, portal server 3, and PC 4 connected via the LAN 24.

The data server 2 is provided with a facial data storage unit 2a to store the facial data indicating the operator's face. The facial data is registered beforehand in the data server 2 with respect to the operator of the MFP 1 in this manner. In the facial data storage unit 2a, as shown in FIG. 2, in addition to the facial data, the facial data of each operator, operator ID, and operator name data indicating an operator name are associated and stored. When there is no facial data (i.e., a non-registered person), data indicating "impossible to authenticate" as an operator ID and "none" as operator name data is stored.

On receiving the facial data from the MFP 1, the data server 2 searches matched facial data from the facial data stored in the facial data storage unit 2a, and transmits the operator ID and operator name data associated with the facial data to the MFP 1. When the matched facial data cannot be searched, the data server 2 transmits "impossible to authenticate" as the operator ID and "none" as the operator name data to the MFP 1.

It is to be noted that the facial data storage unit 2a may be disposed in the MFP 1, and the process of searching the facial data, performed by the data server 2, may be performed by the MFP 1.

Figure 3:
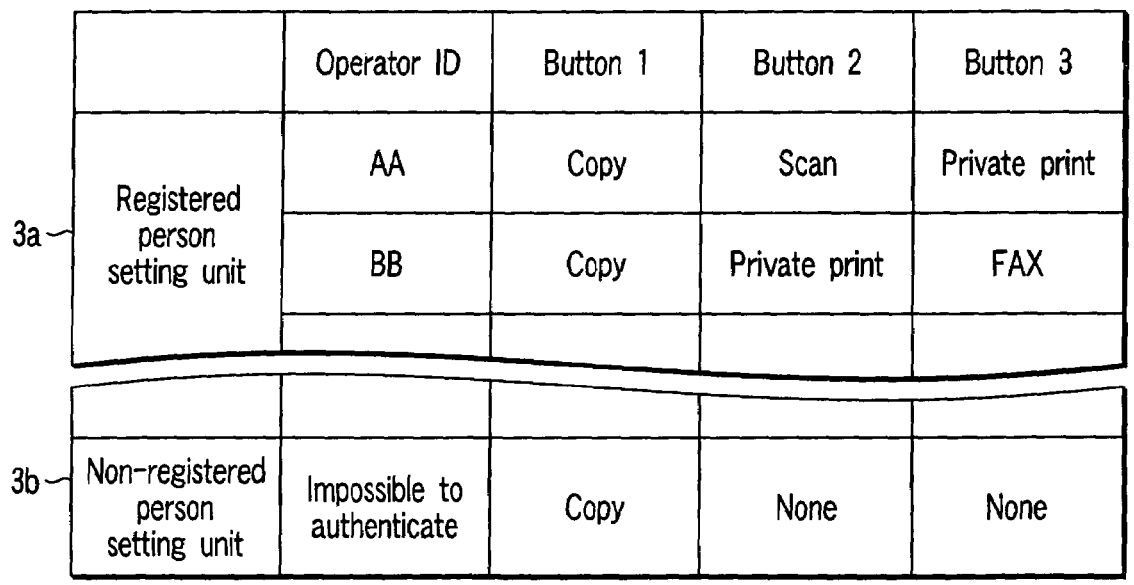
FIG. 3 is a table showing the contents stored in a portal server.

The portal server 3 has a registered person setting unit 3a and a non-registered person setting unit 3b to store portal data. The registered person setting unit 3a stores setting of a function of displaying data for each registered operator in the control panel 15 as the portal data. The non-registered person setting unit 3b stores setting of a function of displaying data in a touch panel with respect to an operator who is not registered as the operator in the facial data storage unit 2a of the data server 2 as the portal data. As shown in FIG. 3, with respect to the registered person whose facial data is registered as the operator in the facial data storage unit 2a, a function of displaying the data in each button in association with the operator ID is assigned. With respect to the non-registered person whose facial data is not registered as the operator in the facial data storage unit 2a, a copying function is assigned to button 1 in association with "impossible to authenticate" which is the operator ID. That is, the non-registered person is set in such a manner than a copying function only can be executed. It is to be noted that the setting assigned to the button in the case where the authentication is impossible can be customized by a manager of the MFP 1. That is, it is possible to freely set limitations of various functions such as a copying function, scanning function, and printing function in accordance with the manager, installing place of the MFP 1, time and the like.

On receiving the operator ID from the MFP 1, the portal server 3 searches the matched operator ID from the registered person setting unit 3a and the non-registered person setting unit 3b, and transmits the portal data associated with the searched ID to the MFP 1.

It is to be noted that the registered person setting unit 3a and the non-registered person setting unit 3b may be disposed in the MFP 1, and the process of searching the operator ID, performed by the portal server 3, may be performed by the MFP 1.

Figure 11:
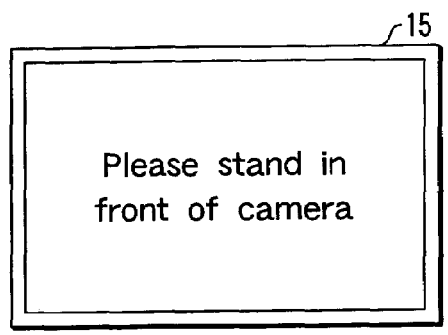
FIG. 11 is a diagram showing an example of the display of the control panel.

Subsequently, a process executed by the CPU 11 of the MFP 1 at a time when the operator operates the MFP 1 in a standby state will be described with reference to FIG. 4. It is to be noted that the MFP 1 displays a message urging the operator to move in such a manner as to be reflected in the camera 19 in the control panel 15 in the standby state (FIGS. 6, 11).

The CPU 11 captures the data photographed by the camera 19 by a capturing function, and judges whether or not the same motion as that stored in the motion data storage unit 183 has been performed (ST101). The CPU 11 continues the standby state, when this judgment results in NO, and warms-up and restores the MFP 1 from the standby state, when the judgment results in YES (ST102). Moreover, the CPU 11 displays that the face authentication process has started in the control panel 15 (ST1-2, FIGS. 7, 12), acquires the operator's facial data from the data photographed by the camera 19 (ST104), and judges that the data is not photograph data, and is a person's data (ST105). The CPU 11 brings the MFP 1 into the standby state again, when the judgment results in NO. When the judgment results in YES, the CPU transmits the acquired facial data to the data server 2 (ST106), and acquires the operator ID and operator name data from the data server 2 (ST107). The CPU 11 performs the display in the control panel 15 based on the acquired operator name data (ST108, FIGS. 8, 13). The CPU 11 transmits the acquired operator ID to the portal server 3 (ST109), and acquires the portal data associated with the operator ID from the portal server 3 (ST110). The CPU 11 controls the display of the control panel 15 based on the acquired portal data (ST111, FIGS. 9, 14). Moreover, when the CPU 11 is instructed to execute a displayed function from the operator, the CPU executes the function (ST112), and stores the operator ID, facial data, operation data, and date/time data in the log data storage unit 141 of the HDD 14 (ST113). Subsequently, the CPU 11 captures the data photographed by the camera 19, and judges whether or not the predetermined motion has been performed (ST114). The CPU 11 continues this state until YES is judged, cancels the display in the control panel 15 when judging YES, displays a message in the standby state in the control panel 15 (ST115, FIG. 6), and brings the MFP 1 into the standby state.

Figure 5:
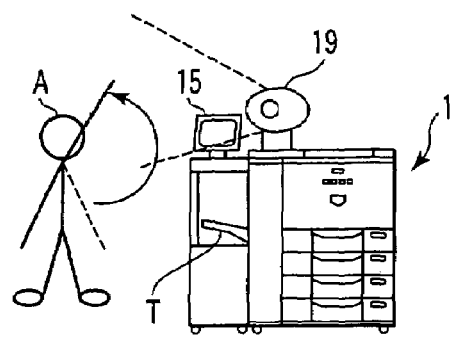
FIG. 5 is a diagram of an image showing that an operator does gesture in a camera of the MFP.

Subsequently, a function will be described with reference to FIGS. 5 to 9 in a case where a registered operator A (operator ID is "AA") raises hand as shown in FIG. 5 and performs the operation. In this case, the motion data indicating at least a gesture of raising the hand as the predetermined motion is stored in the motion data storage unit 183.

Figure 6:
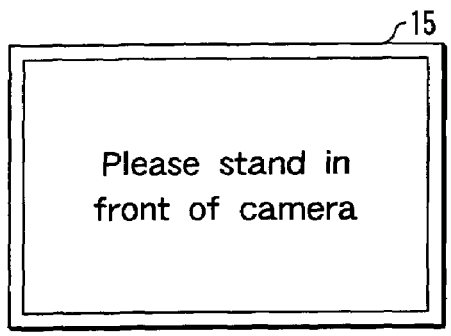
FIG. 6 is a diagram showing an example of display of a control panel.
Figure 8:
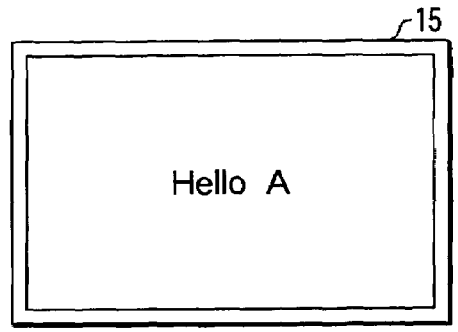
FIG. 8 is a diagram showing an example of the display of the control panel.
Figure 7:
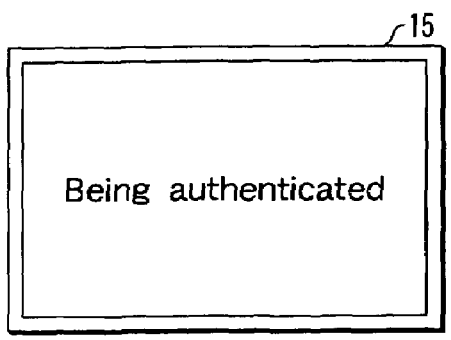
FIG. 7 is a diagram showing an example of the display of the control panel.
Figure 9:
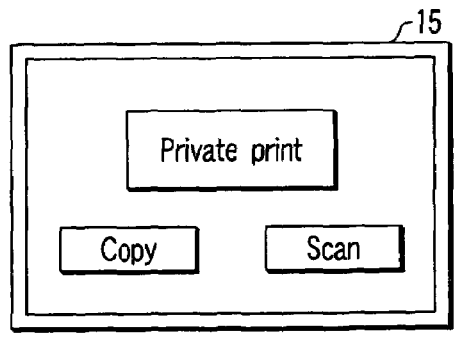
FIG. 9 is a diagram showing an example of the display of the control panel.

In the MFP 1, as shown in FIG. 6, a message "please stand in front of the camera 19" is displayed in the control panel 15 in the standby state. The operator A raises the hand with respect to the MFP 1 in the standby state (toward the camera 19). Then, the MFP 1 detects that a person has done a motion of raising the hand, and starts warming-up to reset from the standby state. Moreover, the MFP 1 starts face authentication of the operator A who is reflected in the camera 19. At this time, as shown in FIG. 7, a message "being authenticated" is displayed in the control panel 15. The MFP 1 acquires the facial data of the operator A photographed by the camera 19, and confirms that the facial data indicates a person (not the data obtained from photographs or the like). Subsequently, the MFP 1 transmits the facial data to the data server 2. The data server 2 searches the facial data matching the facial data transmitted from the MFP 1 from the facial data registered inside. Since the operator A is the registered person, the matching facial data is selected. Moreover, the data server 2 transmits the operator ID "AA" and operator name data "A" associated with the selected facial data to the MFP 1. On receiving the operator ID and the operator name data, the MFP 1 transmits the operator ID "AA" to the portal server 3 this time. In this case, as shown in FIG. 8, "Hello, A" is displayed in the control panel 15 based on the operator name data "A". The portal server 3 transmits the portal data indicating the setting of the function of displaying the data in the control panel 15 in accordance with the operator ID "AA" to the MFP 1. As shown in FIG. 3 described above, in the portal data, copying is set to button 1, scanning is set to button 2, and private printing is set to button 3. As shown in FIG. 9, the MFP 1 displays "copy", "scan", and "private print" in the control panel 15 based on the received portal data. For example, to perform the copying, the operator A touches copy, and executes copying as desired in accordance with a subsequently displayed menu. This operation is stored as log data. After performing this operation, the operator A raises the hand toward the camera 19. Then, the MFP 1 cancels the display in the control panel 15 in accordance with the operator A, displays a message indicating the standby state, and is brought into the standby state.

Figure 10:
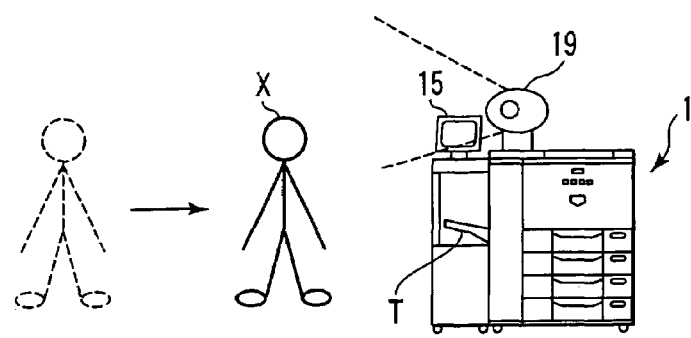
FIG. 10 is a diagram of an image showing that the operator comes toward the camera of the MFP.

Furthermore, a function will be described in a case where a non-registered operator X (operator ID is "impossible to authenticate") approaches the MFP 1 in a camera 19 direction, and performs operation as shown in FIG. 10 will be described with reference to FIGS. 11 to 14. In this case, in the motion data storage unit 183, at least motion data indicating a person's approaching motion as a predetermined operation for restoring from the standby state, and motion data indicating a person's leaving motion as a predetermined operation for shifting to the standby state are stored.

Figure 13:
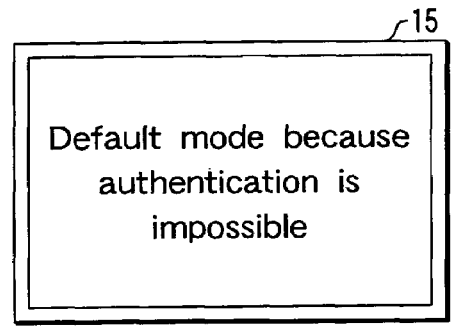
FIG. 13 is a diagram showing an example of the display of the control panel.
Figure 12:
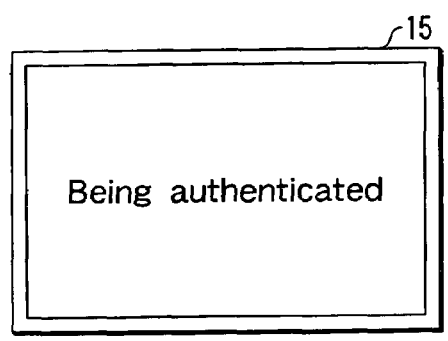
FIG. 12 is a diagram showing an example of the display of the control panel.

In the MFP 1 in the standby state, as shown in FIG. 11, a message "please stand in front of the camera 19" is displayed in the control panel 15. The operator X approaches the MFP 1 in the standby state (toward the camera 19). Then, the MFP 1 detects that the person is approaching, and starts warming-up to reset from the standby state. Moreover, the MFP 1 starts face authentication of the operator X who is reflected in the camera 19. At this time, as shown in FIG. 12, a message "being authenticated" is displayed in the control panel 15. The MFP 1 acquires the facial data of the operator X photographed by the camera 19, and confirms that the facial data indicates a person (not the data obtained from photographs or the like). Subsequently, the MFP 1 transmits the facial data to the data server 2. The data server 2 searches the facial data matching the facial data transmitted from the MFP 1 from the facial data registered therein. Since the operator X is not the registered person, the matching facial data is not searched. Therefore, the data server 2 transmits the operator ID "impossible to authenticate" and operator name data "none" associated with the absence of the facial data to the MFP 1. On receiving the operator ID and the operator name data, the MFP 1 transmits the operator ID "impossible to authenticate" to the portal server 3 this time. In this case, as shown in FIG. 13, "it is a default mode because the authentication is impossible" is displayed in the control panel 15 based on the operator name data "none". The portal server 3 transmits the portal data indicating the setting of the function of displaying the data in the control panel 15 in accordance with the operator ID "impossible to authenticate" to the MFP 1. As shown in FIG.

Figure 14:
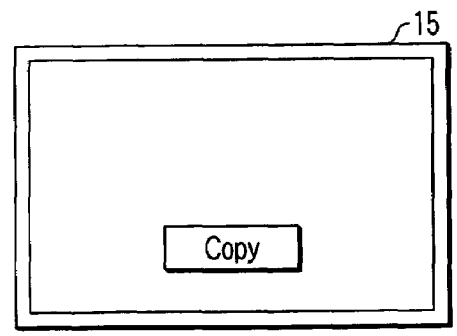
FIG. 14 is a diagram showing an example of the display of the control panel.

3 described above, in the portal data, copying is set to button 1. The MFP 1 displays "copy" in the control panel 15 based on the received portal data as shown in FIG. 14.

For example, the operator X has desired to utilize a scanning function, but cannot perform the scanning because the operator is a non-registered person.

Therefore, the operator X unwillingly touches the copy button, and executes copying in accordance with a subsequently displayed menu. Then, the MFP 1 stores this operation as log data. After performing the operation in this manner, the operator X leaves the camera 19. Then, the MFP 1 cancels the display corresponding to the operator X of the control panel 15, displays a message in the standby state, and is brought into the standby state.

Moreover, for example, the operator X leaves the MFP 1 without utilizing any copying function. In this case, the MFP 1 does not store the motion as the log data. Then, the MFP 1 cancels the display corresponding to the operator X of the control panel 15, displays a message in the standby state, and is brought into the standby state.

According to the MFP 1 of the present embodiment, the predetermined motion is detected to authenticate the operator, the display can be performed in the control panel 15 in such a manner as to obtain the setting customized beforehand with respect to the authenticated operator, and accessibility can be enhanced.

Moreover, the MFP 1 is capable of utilizing the function set beforehand by the manager even with respect to the operator whose has not been registered. Therefore, among the functions of the MFP 1, the non-registered person can use a function which may be used by the non-registered person in consideration of a viewpoint of security. Therefore, the MFP 1 is capable of effectively utilizing the authentication result by the authentication unit 181 as compared with a case where all the functions cannot be used by a person who cannot be authenticated to be the registered person.

Second Embodiment

Next, a second embodiment will be described. It is to be noted that the same parts as those of the first embodiment are denoted with the same reference numerals, and detailed description is omitted.

Figure 15:
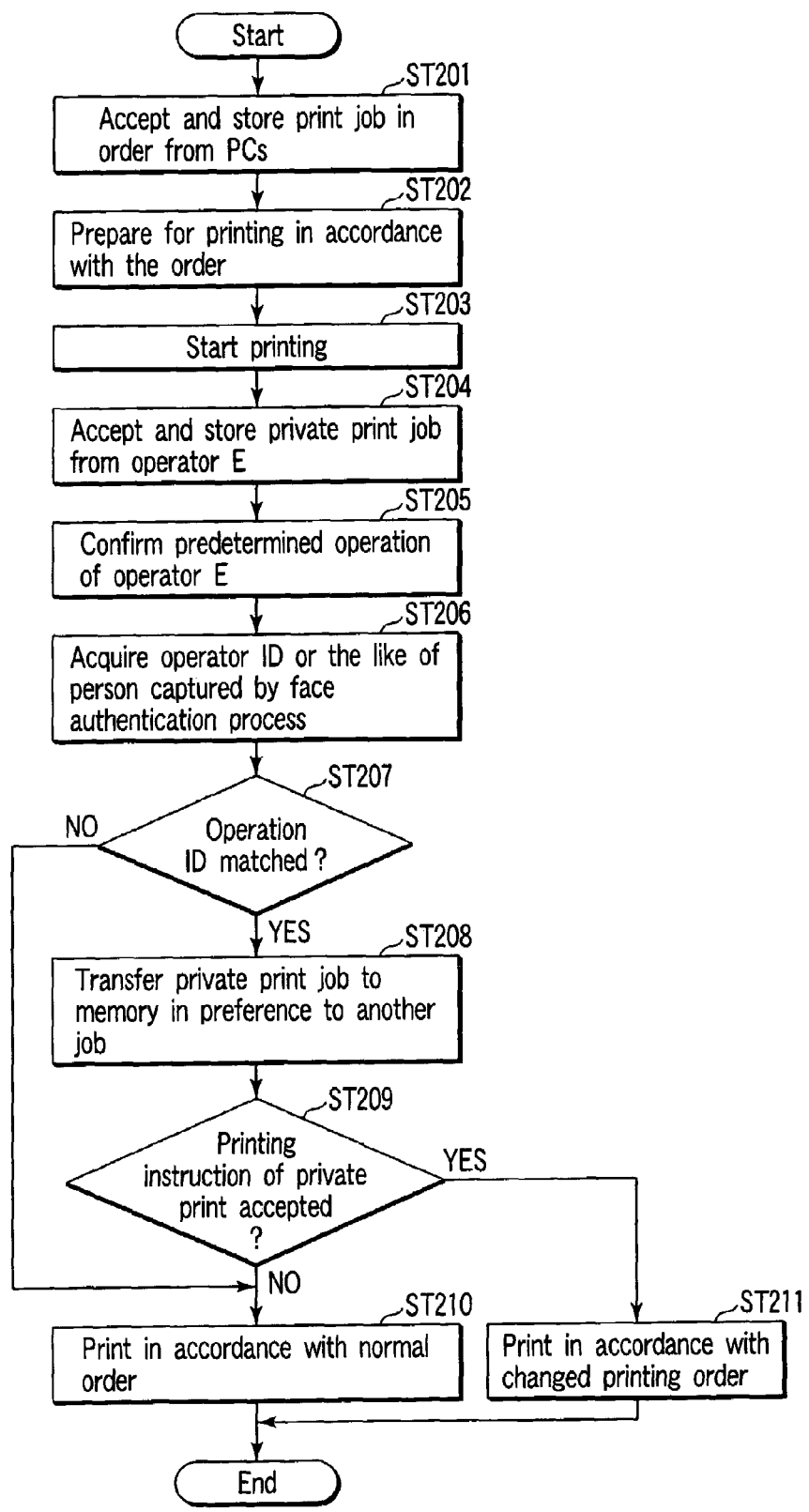
FIG. 15 is a flowchart showing a flow of process executed by the CPU in a second embodiment of the present invention.

In the second embodiment, an MFP 1 receives a private printing job from a PC 4, an authentication unit 181 authenticates an operator of the PC 4, thereafter accepts an instruction from a control panel 15, and executes the private printing job. A process to be executed by a CPU 11 at a time when the private printing job is received after receiving a plurality of jobs will be described hereinafter with reference to FIG. 15.

On accepting printing jobs, for example, from PC 4a, PC 4b, PC 4c, PC 4d connected to a LAN 24 in this order, the CPU 11 once stores the respective printing jobs in a job storage unit 143 of an HDD 14 (ST201). Moreover, the CPU 11 prepares for the printing in accordance with the order stored in the job storage unit 143 (ST202). That is, the printing job first stored in the HDD 14 and transmitted from the PC 4a is transferred to a buffer 171 in a printing unit 17. Then, the CPU 11 operates the printing unit 17 to execute the printing of printing data transferred to the buffer 171 (ST203). Moreover, the CPU 11 accepts the private printing job from the PC 4e, and stores the job in the job storage unit 143 (ST204). Furthermore, on confirming a predetermined motion, for example, a motion of raising hand by an operator E who is the operator of the PC 4e by a motion capturing function (ST205), the face authentication process is performed in the same manner as in the above-described steps ST103 to ST107. An operator ID or the like of a person captured by the face authentication process is acquired (ST206). The CPU 11 judges whether or not the acquired operator ID matches an operator ID associated with the PC 4e which has transferred the private printing job stored in the buffer 171 (ST207). The operator ID associated with the PC 4e is acquired, for example, from a header portion of the private printing job. On judging NO, the CPU 11 advances to a process of ST210, because the person does not transmit any private printing job. On judging YES, the CPU 11 transfers the private printing job stored in the job storage unit 143 to the buffer 171 in the printing unit 17 in preference to another printing job (ST208). Subsequently, the CPU 11 judges whether or not an instruction to perform the private printing has been accepted from a control panel 15 (ST209). On judging NO, the CPU 11 executes the printing in accordance with a normal order (ST210). On judging YES, the CPU executes the printing in accordance with a changed order (ST211).

Figure 16:
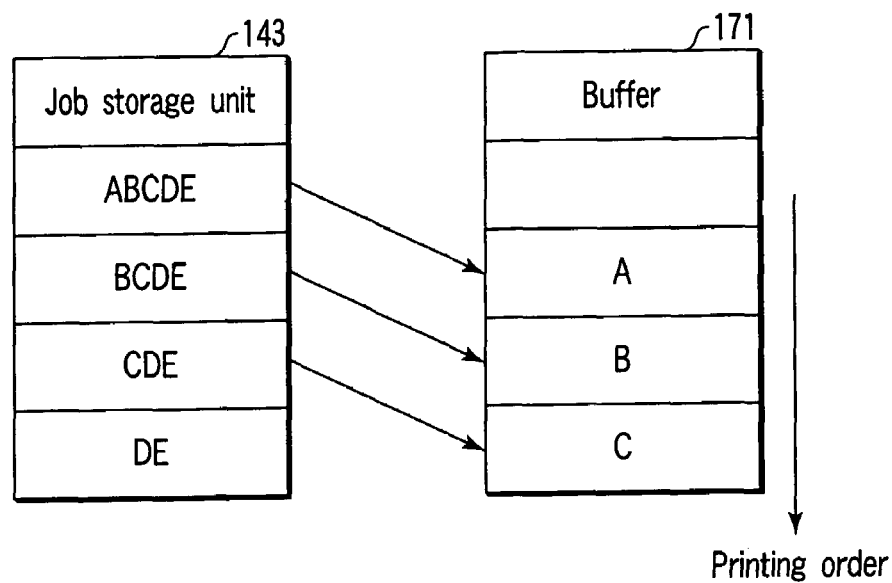
FIG. 16 is a diagram showing a usual printing order.
Figure 17:
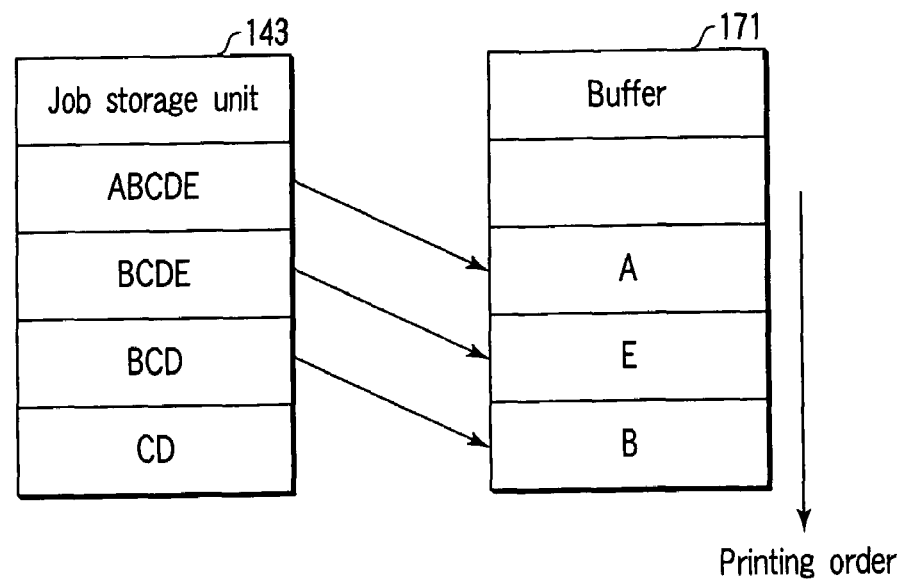
FIG. 17 is a diagram showing a printing order at a time when private printing has priority.

That is, as shown in FIG. 16, when the private printing job is not printed in preference, the printing job and the private printing job are transferred to the buffer 171 from the job storage unit 143 in accordance with a received order. It is to be noted that in the job storage unit 143, "A", "B", "C", "D" indicate the printing jobs transferred from operators A, B, C, D, and "E" shows the private printing job transmitted from the operator E. As shown in FIG. 17, when the private printing job is printed in preference, the printing job and the private printing job are transferred to the buffer 171 from the job storage unit 143 in accordance with a changed order.

The MFP 1 to which the private printing job is transmitted from the PC 4e detects a person's motion of raising the hand to thereby authenticate the operator, judges that the authenticated operator E matches the operator E of the PC 4e, and thereafter executes the printing of the private printing job, when accepting the instruction for the printing from the control panel 15. Since the MFP 1 has a such structure as to perform the face authentication in this manner, the private printing job of the operator can be securely prevented from being printed by another person, and contents of the job can be prevented from being seen by the other person.

Moreover, the MFP 1 has such a structure as to print the private printing in preference, even when another printing job is stored in the job storage unit 143, and operator's accessibility can be enhanced.

Figure 18:
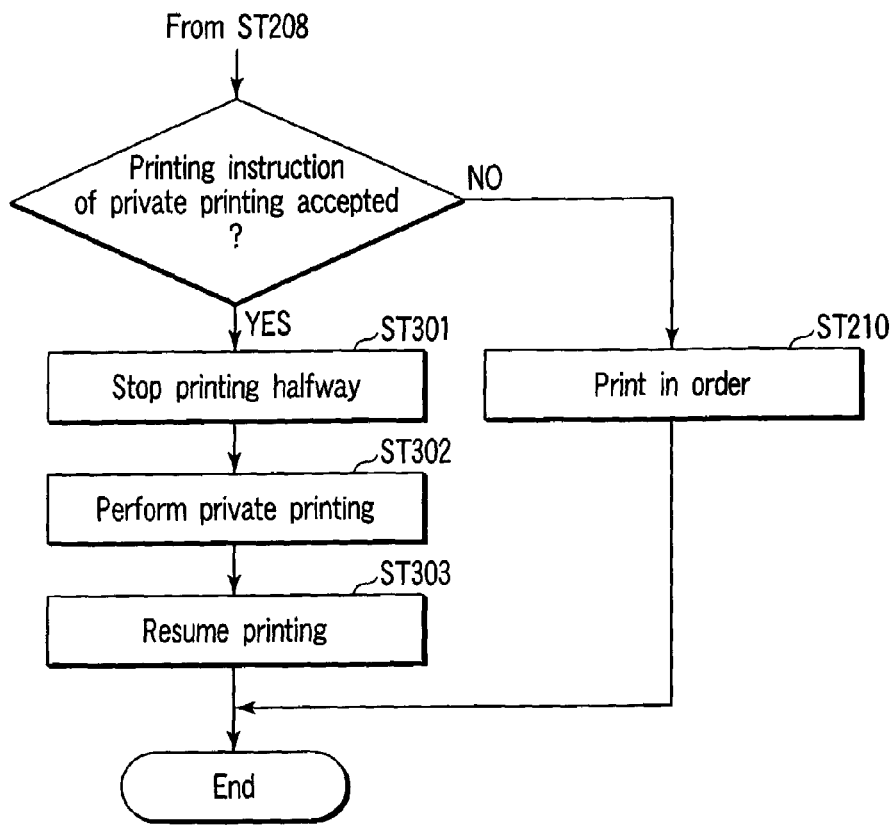
FIG. 18 is a flowchart showing a flow of another process executed by the CPU.

Next, an interrupt process of the private printing by the MFP 1 will be described with reference to FIG. 18. This process comprises a process of steps ST301 to ST303 instead of the process of the step ST211 described with reference to FIG. 15.

On accepting an instruction for the private printing (YES in ST209), the CPU 11 stops the printing of the printing job transmitted from the PC 4a executing the printing halfway (ST301). Moreover, the CPU 11 executes the printing of the private printing job transmitted from the PC 4e (ST302). When the printing of the private printing job ends, the CPU 11 resumes the printing of the printing job transmitted from the PC 4a from the page next to the page stopped halfway, and prints another printing job in order after ending the printing of the printing job (ST303).

When the MFP 1 performs the private printing in this manner, the interrupt process is made possible, and accordingly operator's accessibility can further be enhanced.

Moreover, the MFP 1 is not instructed to execute the printing even after elapse of a certain time after receiving the private printing job in some case. For example, the operator E forgets having transmitted the private printing job from the PC 4e. A process to be executed by the CPU 11 in a case where the private printing job transmitted by the operator E is stored in the job storage unit 143 will be described hereinafter with reference to FIG. 19.

Figure 19:
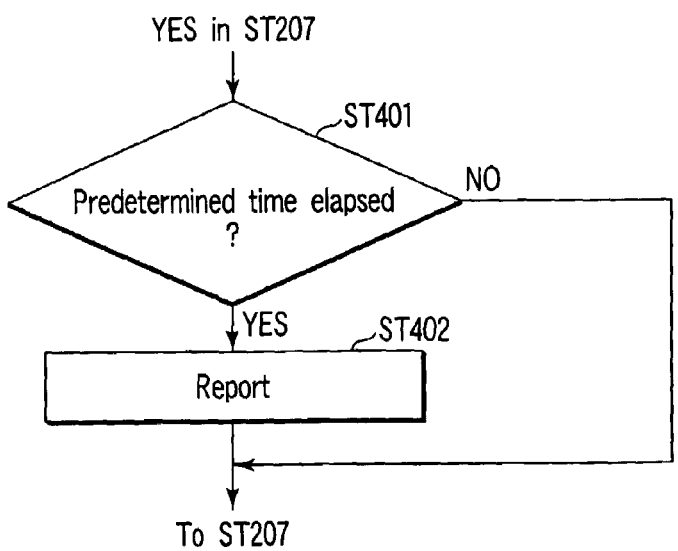
FIG. 19 is a flowchart of a process to inform the operator that there is a printed matter not fetched yet.
Figure 20:
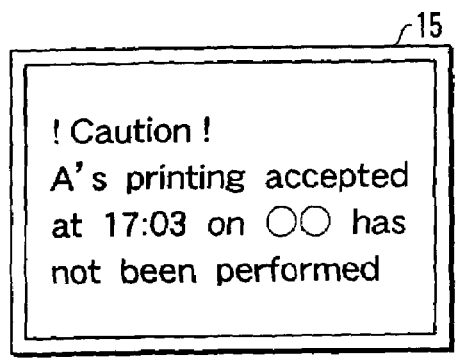
FIG. 20 is a diagram showing a message displayed in the control panel.
Figure 21:
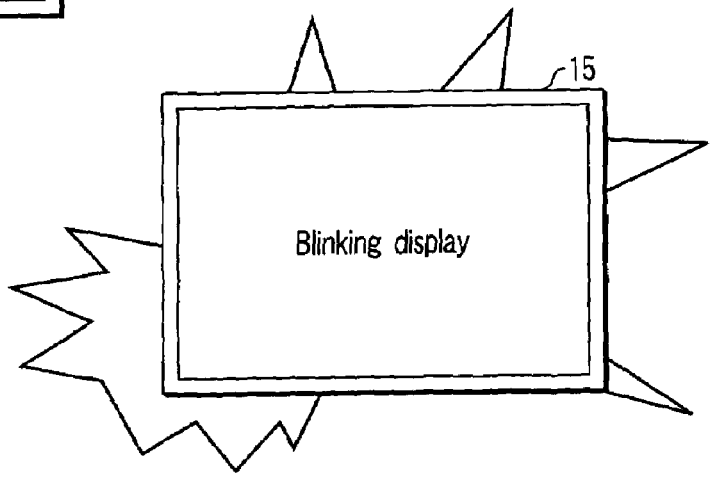
FIG. 21 is a diagram showing blinking display of the control panel.

FIG. 19 is a flowchart of a process to be performed before advancing to a process of the step ST208 after judging YES in the above-described step ST207. To judge whether or not a storage time of the private printing job corresponding to the operator ID in the job storage unit 143 passes a predetermined time, for example, the CPU 11 temporarily stores data indicating date/time at which the private printing job has been received in the memory 12 until the private printing job is executed. The judgment is performed based on the data and present time information produced by the RTC 13 (ST401). The predetermined time can be freely set by the manager of the MFP 1. On judging YES, the CPU 11 informs that the private printing job remains stored and is not printed, utilizing the display of the control panel 15 (ST402). In this informing method, for example, as shown in FIG. 20, a message "!Caution! xx's printing accepted at 17:03 on ○○ has not been done" may be displayed in the control panel 15, and predetermined display may be performed in the control panel 15, that is, blinking display may be performed as shown in FIG. 21. The informing may be performed by sound, when the MFP 1 is provided with a sound output unit, or may be performed by a buzzer, when the buzzer is disposed. Furthermore, for example, words "private job is stored" may be printed in the MFP 1, and a light emitting diode may be disposed near the words, and the light emitting diode may be allowed to emit light to thereby perform the informing.

In this structure, an operator who has forgotten having transmitted the private printing to the MFP 1 can be reminded that the private printing job is stored, when using the MFP 1 is another chance.

Third Embodiment

Next, a third embodiment will be described. It is to be noted that the same parts as those of the first embodiment are denoted with the same reference numerals, and detailed description is omitted.

In the third embodiment, an MFP 1 stores a result of authentication of a person who has fetched a printed matter as authentication result data in an authentication result data storage unit 142, and transmits a mail to an operator who has transmitted a printing job in a case where the operator having transmitted the printing job is different from the person who has fetched the printed matter. This case will be described. In a motion data storage unit 183, data indicating a motion of a person who is approaching the MFP 1 is stored as a predetermined motion. Furthermore, a camera 19 is disposed in such a manner as to photograph the periphery of the MFP 1 including a sheet discharge tray T which is a sheet discharging unit.

A process to be executed by the CPU 11 in a case where the printed matter is laid on the sheet discharge tray T will be described hereinafter with reference to FIG. 22.

The CPU 11 captures the data photographed by the camera 19 using a capturing function, and judges whether or not a person is approaching (ST501). On judging YES, the CPU 11 similarly performs a face authentication process in the same manner as in the steps ST103 to ST107, and acquires an operator ID or the like of the captured person (ST502). Moreover, the CPU 11 judges from the acquired operator ID whether or not the person is a registered person, for example, based on whether or not the acquired operator ID is "impossible to authenticate" (ST503). On judging YES, the CPU 11 specifies the registered person as the person who has fetched the printed matter (ST504), and judges whether or not the person has approached the sheet discharge tray T (ST505). On judging NO, the CPU 11 ends the process because the person is not the person who has fetched the printed matter. On judging YES, the CPU 11 performs a collation process based on the operator ID of the person and log data of a printing job (ST506). In this collation process, it is collated whether or not the person's operator ID exists in operator IDs corresponding to printing jobs within a predetermined number of data (about several data) stored as the log data in a log data storage unit 141 or a predetermined time. Moreover, the CPU 11 refers to a result of the collation process, and judges whether or not the collated operator ID exists (ST507). On judging YES, the CPU 11 judges that facial data used in the face authentication process belongs to the person who has fetched the printed matter, associates the data with the log data, and stores the data together with date/time data and operator ID in the authentication result data storage unit 142 (ST508). In step ST507, on judging NO, the CPU 11 transmits a mail describing the person who has fetched the printed matter together with the facial data used in the face authentication process to a PC 4 which is a transmitter of the printing job used in the collation process (ST509). It is to be noted that a function of automatically preparing the mail has heretofore been available, and description is therefore omitted. A pop screen may be displayed in the PC 4 instead of transmitting the mail. Subsequently, the flow advances to the step ST508.

On the other hand, on judging NO in step ST503, the CPU 11 specifies that the person cannot be authenticated (ST510), and judges whether or not the person has approached the sheet discharge tray (ST511). On judging NO, the CPU 11 ends the process because the person is not the person who has fetched the printed matter. On judging YES, the CPU 11 transmits a mail describing the person who has fetched the printed matter together with the facial data used in the face authentication process to the PC 4 which has transmitted the printing job within the predetermined number of data (about several data) stored as the log data in the log data storage unit 141 or a predetermined time (ST512). Moreover, the flow advances to the process of the step ST508.

Therefore, the MFP 1 performs the face authentication process, and accordingly can associate the facial data of the person who has fetched the printed matter in the sheet discharge tray T, the date/time data, and the operator ID with the log data to store the data as authentication result data. The manager of the MFP 1 confirms the authentication result data, accordingly identifies the person who has fetched the printed matter, and can specify a person who has illegally fetched the printed matter by the facial data, if any. Accordingly, an inhibiting effect against the person who has illegally fetched the printed matter can be obtained.

It is to be noted that even in a structure in which the mail is not transmitted to the PC 4, the authentication result data is stored in the authentication result data storage unit 142. Therefore, when a person comes to take the printed matter, and there is no corresponding printed matter, the authentication result data can be displayed in the control panel 15. Therefore, the inhibiting effect against the person illegally fetching the printed matter can be obtained.

Moreover, in a case where the operator who has transmitted the printing job is different from the person who has fetched the printed matter, the MFP 1 can transmit the mail indicating that there is a person who has fetched the printed matter together with the facial data to the PC 4 which has transmitted the printing job within the predetermined number of data (about several data) stored as the log data in the log data storage unit 141 or a predetermined time. Accordingly, the operator who has not fetched the printed matter can know who has fetched the printed matter.

Figure 23:
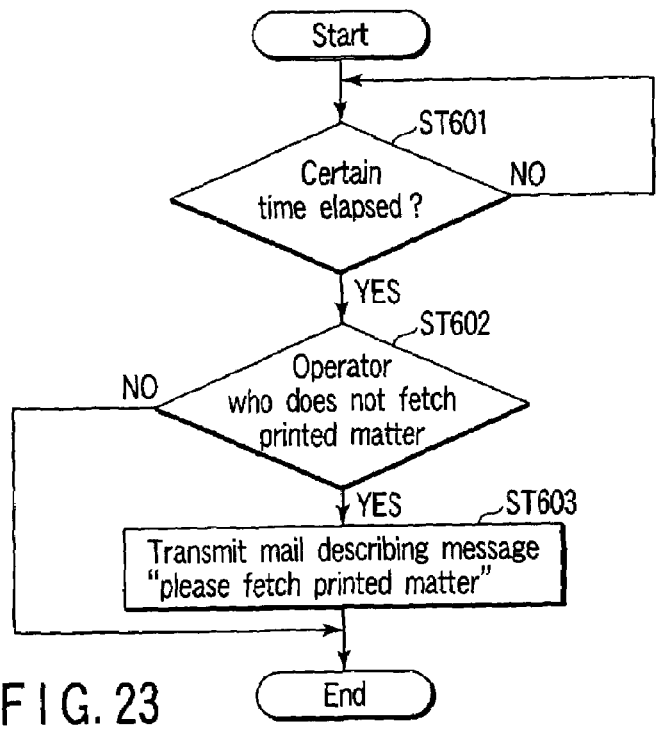
FIG. 23 is a flowchart showing a process to transmit a mail to the operator who has not fetched a printed matter yet.

Moreover, the MFP 1 composed in this manner is capable of performing a process shown in FIG. 23. FIG. 23 is a flowchart showing a process of transmitting the mail to the operator who has not fetched the printed matter.

The CPU 11 judges whether or not a predetermined certain time has elapsed (ST601). On judging that the certain time has elapsed, the CPU 11 judges whether or not there is an operator who has not fetched the printed matter from the log data of the log data storage unit 141 and the authentication result data of the authentication result data storage unit 142 (ST602). This judgment is performed, for example, by judgment as to whether or not there is data in which no facial data is stored in the data of the authentication result data storage unit 142 associated with the log data of the printing job stored in the log data storage unit 141. On judging NO, the CPU 11 ends the process. On judging YES, the CPU 11 transmits the mail describing message "please fetch the printed matter" to the PC 4 of the operator who has been judged not to have fetched the printed matter in the step ST602. Accordingly, the operator to whom the mail has been transmitted can know that the printed matter has not been collected yet.

It is to be noted that in the present embodiments, the present invention applied to the MFP 1 has been described, but, needless to say, the present invention can be applied to a printer.

In the present embodiment, it has been described that the function for performing the invention is recorded beforehand in the apparatus, but the present invention is not limited to this case, and the similar function may be downloaded to the apparatus from a network, or a recording medium in which the similar function is stored may be installed in the apparatus. The recording medium may be CD-ROM or any other mode as long as the program can be stored and the recording medium can be read by the apparatus. Moreover, the function obtained beforehand by installing or downloading may cooperate with an operating system (OS) inside the apparatus to realize the function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus, comprising:
   a camera which photographs an operator;
   an authentication unit to authenticate whether or not facial data indicating an operator's face photographed by the camera indicates a registered person based on a result of searching for the facial data registered in a facial data storage unit in which the facial data indicating the operator's face is registered beforehand;
   a control unit to control an only predetermined function executable by a person other than the registered person in a case where that it is judged that the operator is not the registered person by an authentication result of the authentication unit;
   a motion capture unit which captures a motion of the photographed operator by photographing the motion of the operator in a moving image; and
   a motion data storage unit which stores moving images indicating a preset motion,
   wherein the control unit comprises a process to start warming-up, when judging that the motion of the operator captured by the motion capture unit in a standby state is the same as a motion of the moving image stored in the motion data storage unit.

2. The image forming apparatus according to claim 1, wherein the control unit comprises a process to shift to the standby state, when judging that other motions of the operator captured by the motion capture unit in an operative state is the same as a motion of other moving images stored in the motion data storage unit.

3. An image forming apparatus, comprising:
   a camera which photographs an operator;
   an authentication unit to authenticate whether or not facial data indicating an operator's face photographed by the camera indicates a registered person based on a result of searching for the facial data registered in a facial data storage unit in which the facial data indicating the operator's face is registered beforehand;
   a control unit to control an only predetermined function executable by a person other than the registered person in a case where that it is judged that the operator is not the registered person by an authentication result of the authentication unit;
   a control panel;
   a communication unit which performs communication with a computer connected via a network and which receives a private printing job that starts printing after accepting an instruction of the computer from the control panel and a printing job from the computer;
   a job storage unit which stores the received private printing job and the printing job; and
   a printing unit which executes the printing,
   wherein the control unit comprises a process to judge that the registered person authenticated by the authentication unit matches an operator of the computer, thereafter accept the instruction from the control panel, and execute the printing of the private printing job stored in the job storage unit in the printing unit.

4. The image forming apparatus according to claim 3, wherein the control unit performs the private printing in preference to the printing job in a case where the printing job is stored in the job storage unit, when accepting the instruction.

5. The image forming apparatus according to claim 3, wherein the control unit interrupts the printing job, and prints the private printing job in the printing unit in a case where the printing job is printed, when accepting the instruction.

6. An image forming apparatus, comprising:
   a camera which photographs an operator;
   an authentication unit to authenticate whether or not facial data indicating an operator's face photographed by the camera indicates a registered person based on a result of searching for the facial data registered in a facial data storage unit in which the facial data indicating the operator's face is registered beforehand;
   a control unit to control an only predetermined function executable by a person other than the registered person in a case where that it is judged that the operator is not the registered person by an authentication result of the authentication unit;
   a notifying unit which notifies information;
   a communication unit which performs communication with a computer connected via a network and which receives a printing job including a private printing job that starts printing after accepting an instruction of the computer from the control panel from the computer; and
   a job storage unit which stores the received printing job,
   wherein the control unit comprises a process to notifying that the private printing job is stored by the notifying unit, when judging that the registered person authenticated by the authentication unit matches an operator of the computer whose private printing job is stored in the job storage unit.

7. An image forming apparatus comprising:
a camera which photographs an operator;
an authentication unit to authenticate whether or not facial data indicating an operator's face photographed by the camera indicates a registered person based on a result of searching for the facial data registered in a facial data storage unit in which the facial data indicating the operator's face is registered beforehand;
a control unit to control an only predetermined function executable by a person other than the registered person in a case where that it is judged that the operator is not the registered person by an authentication result of the authentication unit;
a sheet discharging unit on which a discharged printed matter is laid, wherein the camera photographs periphery of the sheet discharging unit including the operator; and
an authentication result data storage unit which stores authentication result data including facial data indicating operator's face and data indicating an authentication result of the authentication unit.

8. The image forming apparatus according to claim 7, further comprising: a log data storage unit which stores log data concerning the printing job stored in the job storage unit, wherein the authentication result data is associated with the log data.

9. The image forming apparatus according to claim 8, further comprising: a communication unit which performs communication with a computer connected via a network and which receives a printing job from the computer; a job storage unit which stores the printing job received by the communication unit; and a printing unit which executes printing,
wherein the control unit comprises a process to transmit a mail to which facial data of the registered person is attached to the computer in a case where the registered person authenticated by the authentication unit is different from an operator of the computer which has transmitted the printing job stored in the log data, after executing the printing of the printing job by the printing unit.

10. The image forming apparatus according to claim 8, further Comprising: a communication unit which performs communication with a computer connected via a network and which receives a printing job from the computer; a job storage unit which stores the printing job received by the communication unit; a printing unit which executes printing; and a time information producing unit which produces time information,
wherein the control unit comprises a process to transmit a mail to the computer which has transmitted the printing job in a case where facial data is not stored in the authentication result data associated with the log data of the printing job even after elapse of a certain time based on time produced by the time information producing unit, after executing the printing of the printing job by the printing unit.

11. A method of authenticating an operator of an image forming apparatus having a camera to perform a specific process, the method comprising:
photographing the operator;
searching facial data indicating an operator's face registered beforehand with respect to facial data indicating the photographed operator's face;
authenticating whether or not the operator is a registered person based on a searching result;
controlling an only predetermined function executable by a person other than the registered person in a case where that it is judged that the operator is not the registered person by an authentication result;
capturing a motion of the photographed operator by photographing the motion of the operator in a moving image;
storing moving images indicating a preset motion; and
starting to warm-up when judging that the motion of the operator captured in a standby state is the same as a motion of the stored moving images.

12. The method according to claim 11, further comprising shifting to the standby state when judging that other captured motions of the operator in an operative state is the same as a motion of other stored moving images.

13. A computer readable medium encoded with a computer program for performing the steps of:
searching facial data indicating an operator's face registered beforehand with respect to facial data indicating the operator's face photographed by the camera;
authenticating whether or not the operator is a registered person based on a searching result;
controlling an only predetermined function executable by a person other than the registered person in a case where it is judged that the operator is not the registered person by the authentication result;
capturing a motion of the photographed operator by photographing the motion of the operator in a moving image;
storing moving images indicating a preset motion; and
starting to warm-up when judging that the motion of the operator captured in a standby state is the same as a motion of the stored moving image.

14. The computer readable medium encoded with a computer program according to claim 13, further comprising shifting to the standby state when judging that other captured motions of the operator in an operative state is the same as a motion of other stored moving images.

* * * * *